US011833858B2

(12) United States Patent
Behr

(10) Patent No.: US 11,833,858 B2
(45) Date of Patent: Dec. 5, 2023

(54) PNEUMATIC VEHICLE TIRE

(71) Applicant: Continental Reifen Deutschland GmbH, Hannover (DE)

(72) Inventor: Ulrich Behr, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 243 days.

(21) Appl. No.: 16/642,926

(22) PCT Filed: May 17, 2018

(86) PCT No.: PCT/EP2018/062847
§ 371 (c)(1),
(2) Date: Feb. 28, 2020

(87) PCT Pub. No.: WO2019/042596
PCT Pub. Date: Mar. 7, 2019

(65) Prior Publication Data
US 2020/0180361 A1 Jun. 11, 2020

(30) Foreign Application Priority Data
Aug. 30, 2017 (DE) ...................... 10 2017 215 185.4

(51) Int. Cl.
B60C 11/01 (2006.01)
B60C 11/12 (2006.01)
B60C 13/02 (2006.01)

(52) U.S. Cl.
CPC .......... B60C 11/01 (2013.01); B60C 11/1204 (2013.01); B60C 13/02 (2013.01); B60C 2011/1213 (2013.01)

(58) Field of Classification Search
CPC . B60C 11/01; B60C 13/02; B60C 2011/1231; B60C 11/1236; B60C 11/0332
See application file for complete search history.

(56) References Cited

U.S. PATENT DOCUMENTS 4,055,209 A 10/1977 Senger
4,166,490 A 9/1979 Poque
(Continued)

FOREIGN PATENT DOCUMENTS

DE 3800857 A * 10/1989 ............ B60B 21/02
DE 3800857 A1 10/1989
(Continued)

OTHER PUBLICATIONS

Kiyoyanagi, English Machine Translation of JP 2000313206, 2000 (Year: 2000).*
(Continued)

*Primary Examiner* — Justin R Fischer
*Assistant Examiner* — Brendon Charles Darby
(74) *Attorney, Agent, or Firm* — Gregory Adams; Richard Wolf

(57) ABSTRACT

Pneumatic vehicle tire having a profiled tread (3), side walls (5) and rounded tire shoulders, wherein, when the tire is mounted on a rim, the tread (3) has, in a first operating state with no load, a first contact surface and outside of the contact surface has profiled shoulder portions (4) extending in the direction of the side walls (5). The shoulder portions (4) have blocks (8a, 8b), between which grooves (9a, 9b) extending in the direction of the side walls (5) are provided and which are provided with sipes (11, 12, 13) and/or grooves extending in the direction of the side walls (5), wherein, in at least one further operating state of the tire mounted on the rim, the tire has a further contact surface, which is wider than the first contact surface and at least partially includes the shoulder portions (4) and the profiling thereof.

13 Claims, 2 Drawing Sheets

(56) References Cited

U.S. PATENT DOCUMENTS

Figure 1:
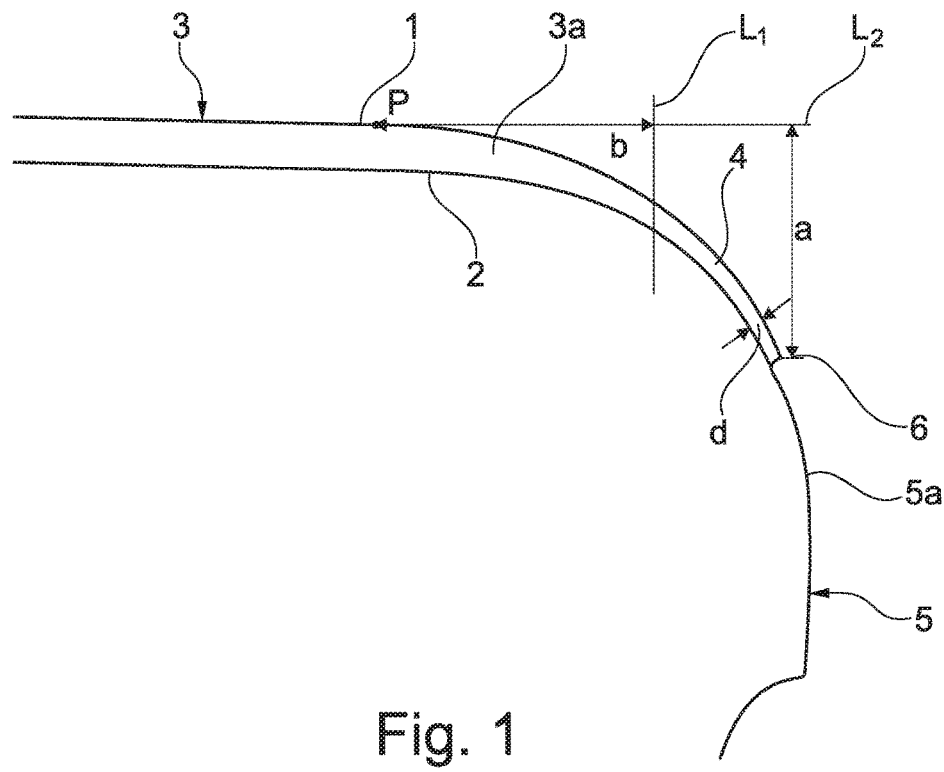

| | | | |
|---|---|---|---|
| 6,439,283 B1* | 8/2002 | Paonessa | B60C 11/0332 |
| | | | 152/200 |
| 8,176,958 B2 | 5/2012 | Rodenbeck | |
| 2008/0105348 A1* | 5/2008 | Byrne | B60C 11/032 |
| | | | 425/28.1 |
| 2008/0202658 A1* | 8/2008 | Ikeda | B60C 11/033 |
| | | | 152/209.27 |
| 2015/0224826 A1 | 8/2015 | Ochi | |
| 2015/0251500 A1 | 9/2015 | Pokutta-Paskaleva et al. | |
| 2017/0361660 A1* | 12/2017 | Furusawa | B60C 11/0316 |

FOREIGN PATENT DOCUMENTS

| | | | | |
|---|---|---|---|---|
| DE | 4010711 A1 | 10/1991 | | |
| EP | 2088007 B1 | 8/2009 | | |
| JP | 2000313206 A * | 11/2000 | | B60C 11/01 |
| WO | WO-2016088856 A1 * | 6/2016 | | B60C 11/0316 |

OTHER PUBLICATIONS

Vonhomeyer, English Machine Translation of DE 3800857, 1989 (Year: 1989).*
International Search Report dated Jul. 27, 2018 of International Application PCT/EP2018/062847 on which this application is based.

* cited by examiner

PNEUMATIC VEHICLE TIRE

The invention relates to a pneumatic vehicle tire having a profiled tread, side walls and rounded tire shoulders, wherein, when the tire is mounted on a rim, the tread has, in a first operating state, a first contact surface and outside of the contact surface has profiled shoulder portions extending in the direction of the side walls.

Pneumatic vehicle tires for motor cars are usually embodied in such a way that the profile blocks which extend on the shoulder side in that part of the tread which makes contact with the ground and the transverse grooves which extend between said blocks extend beyond the ground contact surface of the tread and run out approximately as far as the start of the side wall in the outer shoulder region. Moreover, EP 2 088 007 B1 discloses the practice of providing shoulder block rows in a tread, the blocks of which extend beyond the ground contact surface of the tread, wherein a flat flank block, which either has a constant height or a height which increases in the direction of the side wall and is delimited by edges extending at least substantially in the radial direction, is in each case additionally arranged on the shoulder flanks of said blocks. This pneumatic vehicle tire thus makes available traction edges in the "off-shoulder" region and these can take effect when the tire is being driven on a soft underlying surface and is correspondingly sinking into said underlying surface. The flank blocks therefore have an effect only under very particular and somewhat rare conditions.

It is the underlying object of the invention to be able to improve the traction performance of the tread in a much more effective and flexible way and whenever required.

According to the invention, the stated object is achieved by virtue of the fact that the shoulder portions have blocks, between which grooves extending in the direction of the side walls are provided and which are provided with sipes and/or grooves extending in the direction of the side walls, wherein, in at least one further operating state of the tire mounted on the rim, the tire has a further contact surface, which is wider than the first contact surface and at least partially includes the shoulder portions and the profiling thereof.

Tires embodied in accordance with the invention can be used in various operating states on the same vehicle in the mounted state and have profiling in the shoulder portions which is optimized in respect of traction, although this is effective not in the first operating state but in at least one further operating state, in which the shoulder portions are at least partially already within the ground contact surface. In an operating state of this kind, at least partial regions of the shoulder portions, as well as the part of the tread situated between them, therefore come into contact with the underlying surface. As a result, the ground contact surface is not only significantly wider than in the first operating state but the transverse edges of the profiling situated there, which are important for good traction and optimum lateral support, come into effect within the ground contact surface, in the lateral regions of the tread.

In a preferred embodiment, the blocks are separated from the remaining profiling, situated within the first contact surface, of the tread by a groove extending in the circumferential direction. This groove can extend in a zigzag or wavy shape and in this way can contribute a certain amount to the traction properties in a further operating state, but it can also run straight around in the circumferential direction.

This groove can furthermore extend either within or outside or partially within and partially outside the first contact surface in the first operating state, thus enabling certain properties of the tread to be influenced in this way in the first operating state. This groove is furthermore shallower than the deepest grooves in the profiling which comes into contact with the underlying surface in the first operating state.

An embodiment in which the shoulder portions are completely in the contact surface in a further operating state of the tire mounted on the rim is particularly advantageous. This operating state is chosen particularly if the tire requires particularly effective traction, e.g. on snow, slushy snow or slush of some other kind.

Particularly advantageous and preferred embodiments of the sipes in the blocks of the shoulder portions enhance the effect of the shoulder portions in the further operating states of the tire. Thus, the blocks can be provided with at least one, in particular with a plurality of, sipes, which have at least one portion that extends in a zigzag or wavy shape in plan view or which extend in a zigzag or wavy shape over their entire extent. A straight profile of these sipes in plan view is also possible. It is particularly advantageous if these sipes have a width of 0.5 mm to 1.0 mm and a depth of 1.5 mm to 2.5 mm at the periphery of the blocks.

In addition or as an alternative, the blocks in the shoulder portions are at least partially provided superficially and in a manner similar to hatching by sipes which have a width and a depth of 0.3 mm to 0.6 mm. In the first operating state of the tire, these sipes extend outside the ground contact surface and in the radial direction and, in an operating state in which the shoulder portions are within the contact surface, they extend in the axial direction.

Another embodiment which has advantageous effects on the traction properties of the shoulder portions consists in that, when viewed in the circumferential direction, the grooves between the blocks of the shoulder portions extend at an acute angle, which is preferably 5° to 30°, to the radial direction in the first operating state, wherein the slope of these grooves is such that they slope alternately in one and the other circumferential direction relative to the radial direction.

The pneumatic vehicle tire is provided for use or mounting on a rim, the rim width of which is variable, wherein the rim is adjusted to a smaller, in particular to the smallest, rim width in the first operating state than in the further operating states. In the first operating state, the tire is furthermore operated at an internal pressure which is adjusted to a higher value than in the further operating states.

Figure 2:
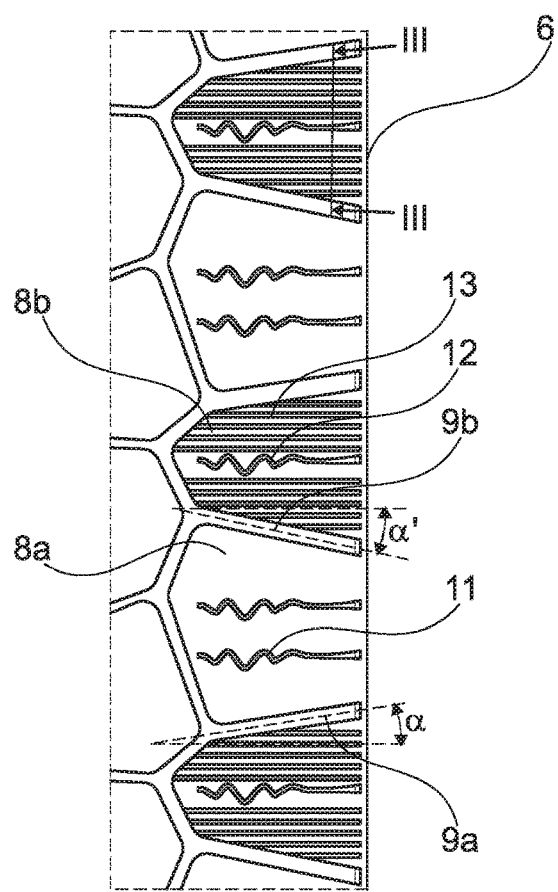
Figure 3:
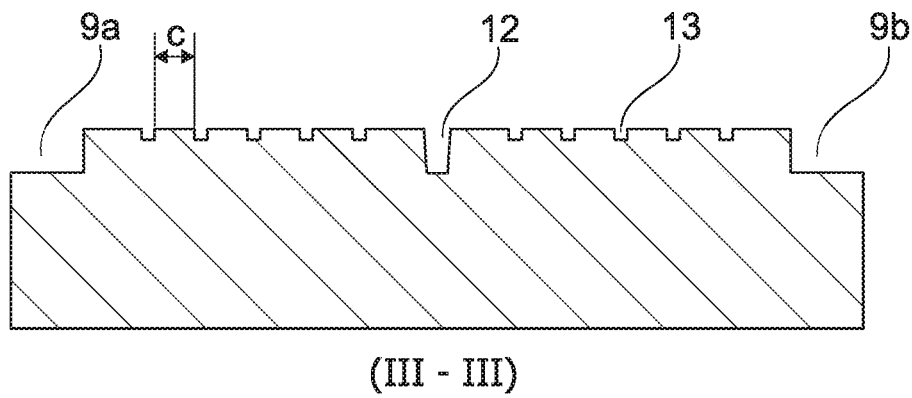
Figure 4:
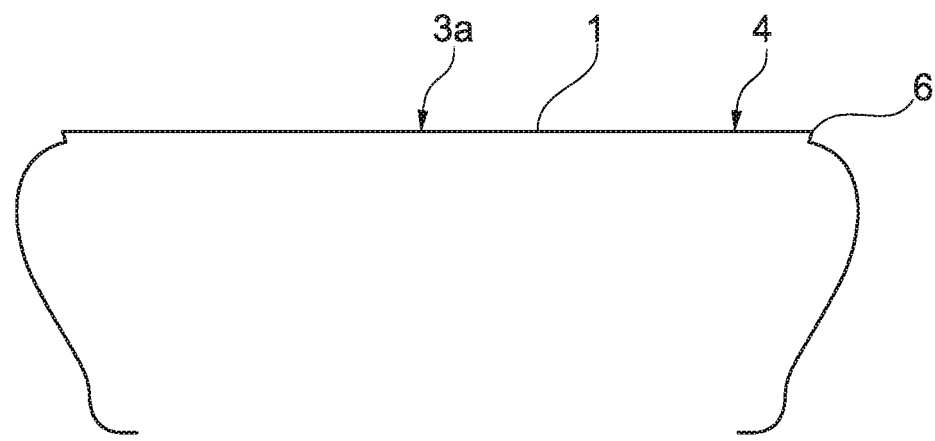

Further features, advantages and details of the invention will now be described in more detail on the basis of the drawing, which illustrates an exemplary embodiment. In the drawing, FIG. 1 shows schematically a sectional view (cross section) of a portion of a tread and side wall contour of a pneumatic vehicle tire, FIG. 2 shows a variant embodiment of profiling provided in the shoulder region, in plan view, FIG. 3 shows a sectional illustration along the line of FIG. 2, and FIG. 4 shows the tread and side wall contour of the pneumatic vehicle tire under changed operating conditions.

The sectional view in FIG. 1 shows the outer contour 1 and the reinforcing contour 2 of a tread 3 of a pneumatic vehicle tire of radial design for motor cars, vans or light trucks. The outer contour 1 extends along the envelope of profiling (not illustrated in FIG. 1) of the tread 3. When the tire is mounted on a rim, the tread 3 has a first contact surface under first operating conditions, wherein the portion of the tread 3 which is denoted by 3a in FIG. 1 comes into contact with the underlying surface under the first operating conditions. In FIG. 1, one lateral boundary of the portion 3a is indicated by a line $L_1$ extending in the radial direction. Adjoining the portion 3a on both sides there is a respective shoulder portion 4, which is outside the contact surface under the first operating conditions and adjoining which there is a respective side wall 5, of which only the outer contour 5a is illustrated in FIG. 1. The first operating conditions are defined such that the pneumatic vehicle tire concerned is mounted on a standard rim, is subjected to 70% of the maximum load-bearing capacity, and its internal pressure is 85% of the standard pressure, in each case in accordance with ETRTO standards.

Apart from the tread 3 and the side walls 5, the tire has the conventional components, which are sufficiently well known to a person skilled in the art, such as a multi-ply breaker belt assembly, a radial-ply carcass, an inner layer and bead regions with bead cores and core fillers.

The outer contour 1, shown in FIG. 1, of the tread 3 is that of the tire under no load, mounted on its standard rim and inflated to an internal pressure of 85% of the standard pressure. As FIG. 1 shows, the outer contour 1 is rounded in the portion 3a and over the shoulder portion 4 in the no-load state, wherein the shoulder portion 4 ends at an edge 6.

Adjoining this edge 6 is a transitional rounded portion leading to the side wall 5, with the result that the side wall 5 is offset inward relative to the shoulder portion 4. In the no-load state of the tire shown in FIG. 1, the edge 6 is at a distance a, determined in the radial direction, from a line $L_2$ extending in the axial direction through the tire zenith on the outer contour 1, of 35 mm to 50 mm, depending on the tire dimensions. Between the edge 6 and a point P on the outer contour 1, which is at a distance b, determined in the axial direction, of 15% to 25% from the line $L_1$, the outer contour 1 of the tread 3 is virtually in the form of a circular arc. In this case, the rounding of the outer contour 1 in this portion can consist of circular arcs of different radii, but the sizes thereof differ from one another by at most ±3.0 mm. Thus, this portion of the outer contour consists of circular arcs, the radii of which are 76 mm to 79 mm, for example.

The reinforcing contour 2 of the tread extends as an envelope along deepest points of grooves of the profiled portions situated in the portion 3a and in the shoulder portions 4, wherein, in the shoulder portions 4, the outer contour 1 is at a constant or largely constant distance d of 2 mm to 3 mm from the reinforcing contour 2. As FIG. 2 shows, the profiling in the shoulder portions 4 comprises blocks 8a, 8b which are separated from one another in the circumferential direction by grooves 9a, 9b extending in the direction of the edge 6. The blocks 8a, 8b and the grooves 9a, 9b extend as far as the edge 6 or almost as far as the edge 6, wherein the grooves 9a, 9b have a depth of up to 3.0 mm. With respect to the portion 3a of the tread 3, the blocks 8a, 8b in the embodiment shown are each delimited by boundary edges extending in a shallow V shape. Together with boundary edges of an adjacent block row, which is provided in the portion 3a and is merely indicated in FIG. 2, these boundary edges result in a groove which runs around in a zigzag shape in the circumferential direction.

The grooves 9a alternate with the grooves 9b, wherein the grooves 9a slope at an acute angle α to one circumferential direction relative to a line perpendicular to the edge 6 in a plan view of the shoulder portions 4, while the transverse grooves 9b all slope at a, preferably equal, acute angle α' to the other circumferential direction. The acute angles α and α' are of the order of 5° to 30°. Due to the shape of the grooves 9a, 9b, the blocks 8a have a somewhat smaller circumferential extent at the edge 6 than in the region of their boundary edges extending in a shallow V shape, and accordingly the blocks 8b have a larger circumferential extent at the edge 6 than at their boundary edges extending in a shallow V shape, which are situated opposite the edge 6. At the edge 6, the blocks 8a, 8b have a circumferential extent of the order of 20 mm to 35 mm, wherein the blocks 8a occupy a larger area than the blocks 8b in the embodiment shown.

Extending within the blocks 8a are two sipes 11, which have a zigzag shape in plan view over at least 50% of their extent. In the first operating state, the sipes 11 extend over the blocks 8a in the radial direction and therefore in the direction of the edge 6, parallel to one another and approximately centrally in each block 8a. Extending centrally within the blocks 8b there is in each case a sipe 12, likewise with a zigzag shape over at least 50% of its extent. Over their extent or the majority of their extent, the sipes 11 and 12 have a depth which is preferably 1.5 mm to 2.5 mm. At the surface of the blocks 8a, 8b, the sipes 11, 12 have a width of 0.5 mm to 1.0 mm. Superficially, the blocks 8b are furthermore provided with a multiplicity of shallow sipes 13, which extend parallel to one another and in a straight line, traverse the blocks 8b in the radial direction in the first operating state, and have a depth and a width of 0.3 mm to 0.6 mm, in particular of 0.5 mm. As FIG. 3 shows, their mutual spacing c is 1.2 to 1.7 mm, in particular 1.5 mm. The sipes 13 therefore cross each block 8b in the manner of hatching on both sides of the central sipe 12.

FIG. 4 shows schematically a further operating state of the pneumatic vehicle tire in a state mounted on a rim (not shown), wherein the tread 3 also comes into contact by means of its shoulder portions 4 with the underlying surface in this operating state as a result of an enlargement of the rim width of the rim and of a reduction of the internal pressure of the tire. FIG. 4 shows only the outer contour 1 of the tread 3. The tire is mounted on a special rim, the rim width of which can be adjusted by means of a mechanism, in particular a mechanism that can be actuated from the cockpit of the vehicle, although the rim and this mechanism are not the subject matter of this invention. The measures which allow a corresponding reduction of the internal pressure of the tire, in particular from the cockpit of the vehicle, are likewise not the subject matter of this invention. The rim width of the rim can also be adjustable in intermediate stages or continuously, with the result that the shoulder portions 4 do not come completely into contact with the underlying surface but only partially.

Particularly in the operating state illustrated in FIG. 4, the profiling in the shoulder portions 4 enhances the traction performance of the tire and power transfer from the tire to the underlying surface. The higher traction performance is particularly advantageous especially on a soft underlying surface, such as snow, slushy snow, slush of some other kind or mud.

LIST OF REFERENCE SIGNS

1. . . . Outer contour
2. . . . Reinforcing contour
3. . . . Tread
3a . . . Portion
4 . . . Shoulder portion
5 . . . Side wall
5a . . . Outer contour
6 . . . Edge
8a, 8b . . . Block
9a, 9b . . . Groove 10 . . . Groove
11, 12, 13 . . . Sipe
α, α' . . . Angle
a, b, c . . . Distance

The invention claimed is:

1. A pneumatic vehicle tire comprising: a profiled tread, side walls; rounded tire shoulders in a first operating state, the profiled tread having a first contact surface and outside of the contact surface has profiled shoulder portions extending in the direction of the side walls and an edge of the profiled tread at a distance a in a radial distance from a line $L_2$ extending in the axial direction through a tire zenith, the first operating state is the tire under no load; wherein the shoulder portions have blocks, between which grooves extending in the direction of the side walls are provided the blocks are provided with sipes extending in the direction of the side walls; the tire has a second contact surface in a load state, which is wider than the first contact surface and includes the shoulder portions and the profiling thereof, the load state is the tire subjected to at least 70% of a maximum load-bearing capacity; wherein the shoulder portions are completely in the second contact surface in the load state; the edge of the profiled tread is in contact with an underlying surface in the load state and is at a distance greater than zero from the underlying surface in the first operating state; and the grooves of the shoulder portions extend at an acute angle of between 50 to 300 in the radial direction in the first operating state and the grooves slope alternately in one and another circumferential direction relative to the radial direction; the blocks of the shoulder portions are located at the edge and alternately have two sipes and a plurality of first sipes with a single sipe, the plurality of first sipes have depths less than the depths of the two sipes and the single sipe.

2. The pneumatic vehicle tire as claimed in claim 1, wherein the blocks are separated from the remaining profiling, situated within the first contact surface, of the tread by a groove extending in the circumferential direction.

3. The pneumatic vehicle tire as claimed in claim 2, wherein the groove which separates the blocks in the shoulder portions from the remaining profiling of the tread extends either within or outside or partially within and partially outside the first contact surface in the first operating state.

4. The pneumatic vehicle tire as claimed in claim 1, wherein one or more of the sipes extend in a zigzag or wavy shape in plan view.

5. The pneumatic vehicle tire as claimed in claim 1, wherein one or more of the sipes have a width of 0.5 mm to 1.0 mm and a depth of 1.5 mm to 2.5 mm at the periphery of the blocks.

6. The pneumatic vehicle tire as claimed in claim 1, wherein one or more of the sipes have a width and a depth of 0.3 mm to 0.6 mm.

7. The pneumatic vehicle tire as claimed in claim 1, wherein the grooves between the blocks of the shoulder portions have a depth of 1.5 mm to 2.5 mm.

8. The pneumatic vehicle tire as claimed in claim 1, wherein a rim on which the tire is mounted is adjusted to a smaller rim width in the first operating state than in the load state.

9. The pneumatic vehicle tire as claimed in claim 1, wherein an internal pressure in the tire is adjusted to a higher value in the first operating state than in the load state.

10. The pneumatic vehicle tire as claimed in claim 1, further comprising a rim having a variable width.

11. The tire of claim 1, the tire mounted on an adjustable width rim having its width adjustable to set tire pressure corresponding to one of the first operating state and the load state.

12. The tire of claim 11, the adjustable width rim adjustable by a cockpit mechanism.

13. The tire of claim 1, the blocks of the shoulder portions engage the underlying surface in the load state and disengage the underlying surface in the first operating state.

* * * * *